(12) United States Patent
Bloch

(10) Patent No.: US 7,796,340 B2
(45) Date of Patent: Sep. 14, 2010

(54) METHOD AND APPARATUS FOR MAXIMUM LIGHT INTENSITY FOR AN OPTICAL ILLUMINATION SYSTEM

(75) Inventor: Stephanie Bloch, Rush, NY (US)

(73) Assignee: Quality Vision International, Inc., Rochester, NY (US)

(*) Notice: Subject to any disclaimer, the term of this patent is extended or adjusted under 35 U.S.C. 154(b) by 0 days.

(21) Appl. No.: 11/784,126

(22) Filed: Apr. 5, 2007

(65) Prior Publication Data
US 2008/0247023 A1    Oct. 9, 2008

(51) Int. Cl.
G02B 27/12    (2006.01)
G02B 26/08    (2006.01)

(52) U.S. Cl. .................................. 359/640; 359/211.2

(58) Field of Classification Search .................. 359/629, 359/639–640, 211.2–211.5, 831, 833–837
See application file for complete search history.

(56) References Cited

U.S. PATENT DOCUMENTS 3,880,148 A * 4/1975 Kanehira et al. ............ 600/173
5,243,465 A * 9/1993 Fein ........................... 359/636
2002/0159157 A1* 10/2002 Deverin et al. .............. 359/629
2006/0007344 A1* 1/2006 Neufeld ...................... 348/336

FOREIGN PATENT DOCUMENTS

DE    19708684    * 6/1997
JP    54-98255    * 8/1979

* cited by examiner

*Primary Examiner*—Alicia M Harrington
(74) *Attorney, Agent, or Firm*—Stephen B. Salai, Esq.; Thomas B. Ryan, Patent Agent; Harter Secrest & Emery LLP

(57) ABSTRACT

An illumination system using, in place of a more typical beam splitter, two right angle triangular prisms that are aligned to each other along their respective hypotenuses to form a cube, but without any reflective materials being used at their interface, and with the two halves separated by some distance so as to create an open/air gap between the two halves. When the upper/lower cube faces are normal to an optical axis of the illumination system, the cube structure reflects virtually all of the illumination from a transverse illumination source using total internal reflection so that said illumination is reflected out of the cube along the system's optical axis. However, rotating the cube structure past the critical angle eliminates total internal reflection and allows the cube to transmit almost all illumination entering the cube out of the cube parallel to the system's optical axis.

19 Claims, 5 Drawing Sheets

METHOD AND APPARATUS FOR MAXIMUM LIGHT INTENSITY FOR AN OPTICAL ILLUMINATION SYSTEM

BACKGROUND AND SUMMARY

My invention relates to automated metrological machines used for optical inspection of an object. Metrological machines are typically employed for the automated optical inspection of manufactured objects, and are particularly useful in determining the precise dimensional measurements of such objects. They normally include a support on which the work object rests, and means for precisely moving either the object or an imaging video camera that is used for recording and/or displaying a magnified image of the object that is being inspected. These features allow such machines to perform precision measurements in the horizontal (or X-Y) plane. Autofocus means can also be included for determining heights of the object along the "Z" axis normal to the X-Y plane, enabling a full, three-dimensional inspection of the object.

A good example of an advanced metrological machine system is provided by U.S. Pat. No. 6,292,306, for a "Telecentric Zoom Lens System for Video Based Inspection System" (2001). In this patent, the object to be inspected is positioned on a support surface beneath a series of imaging lenses that are secured to a system support that overlies the support surface and object. The lenses have an optical axis disposed vertically and the system includes a coaxial adjustable telecentric stop or iris diaphragm and two moving groups of lenses for performing magnification zooming, where these are controlled by cam and slot means as in conventional zoom lenses. (See, also, U.S. Pat. No. 5,389,774 describing a system allowing a user to perform calibration and return to a previously saved magnification by saving a reticle image at a selected magnification, calling up that image when that magnification is desired again, and waiting for the zoom lens to adjust until the present reticle image matches the saved reticle image).

The complete system may also include a substage collimator or illuminator to offer a silhouette image of the object as further described in U.S. Pat. No. 6,488,398, and an LED ring surface illuminator. The LED ring surface illuminator, as further described in U.S. Pat. Nos. 5,690,417 and 6,179,439, allows contours, ledges, edges and other generalized surface height variations to be imaged. Finally, and most importantly for the purposes of this invention, a "beam splitter" within the lens system can be used to inject surface inspection illumination from an illumination source transverse to the optical axis along the optical axis through the lens ("TTL"). (See, e.g., "illuminator light source S" in U.S. Pat. No. 6,292,306 and its accompanying drawing figures).

The TTL illumination allows microscopic surface details to be imaged. For objects with little or no contrast, a TTL grid illumination source can also be used along with the TTL surface illumination source. The grid is projected onto the surface of the object and is illuminated by a separate light source transverse to the optical axis of the TTL illumination system, reflected off of a separate beam-splitter on the optical axis of the TTL illumination system, and projected through the front lens onto the object to be imaged as discussed in the preceding paragraph.

However, while beam splitters make the aforesaid TTL illumination systems possible, they also lead to certain problems. Beam splitters typically take the form of a half-silvered mirror, or a cube made from two triangular glass prisms. The mirror-type (or plate) beam splitter is an optical window with semi-transparent mirrored coating used to separate a single beam into two beams. Beam splitter cubes are more advanced beam splitters consisting of two right-angle prisms cemented together at their hypotenuse faces. The hypotenuse face of one prism is coated with a metallic or dielectric layer having the desired reflecting properties. Thus, when the plate beam splitter is arranged at a 45 degree angle to the optical axis, a portion, typically half, of the incipient light traveling along the optical axis will be reflected and the rest transmitted. Likewise, when a 50/50 cube beam splitter is arranged along the optical axis such that two faces of the cube are normal to the axis and the hypotenuses of the two triangular glass prisms are at a 45 degree angle to the optical axis, half of the incipient light traveling along the axis will, once again, be reflected and half transmitted.

Thus, as will be appreciated by those skilled in the art, while each beam splitter can be used to insert useful illumination along an optical axis for TTL illumination purposes, it also will divert and thereby diminish light already traveling along that optical axis. Consequently, the inclusion of both a TTL surface illumination system and a TTL grid illumination system in the same metrological machine system (where one is oriented to project light directly along the illumination system's optical axis and the other injects light transverse to that axis) generally leads to light level problems.

Typically, the TTL surface illumination system is oriented to project light along the illumination system's optical axis with an additional beam splitter for the TTL grid illumination system, as previously described, in the optical path for TTL illumination intermediate the target object and the respective light sources. Where, for example, a 50/50 beam splitter is used in this role (as is typical), neither system has truly adequate illumination.

I have, therefore, sought and invented a system that, instead of using a 50/50 beam splitter of the types outlined above to inject TTL grid illumination, uses two right angle triangular prisms (similar to those used in a cube beam splitter) that are aligned to each other along their respective hypotenuses (like a cube beam splitter), but without gluing the two triangular sections together, without any reflective materials being used at their interface, and with the two halves separated by some distance so as to create an open/air space between the two halves. When the upper/lower cube faces are normal to the optical axis of the illumination system, the system reflects virtually all of the illumination from the TTL grid illumination source through the lens ("TTL") onto the work object due to total internal reflection ("TIR"). However, turning the "cube" a mere 12 degrees, past the critical angle, eliminates total internal reflection and allows almost all of the light from the TTL surface illumination system to pass through the "cube" to illuminate the work object.

Thus, by utilizing the principle of TIR, I allow nearly 100% of the reflected light for imaging the grid to exit the illumination system for illumination of the work object and, by rotating the "cube" slightly past the critical angle, I allow nearly 90% of the light from the TTL surface illumination source to exit the illumination system for work object illumination. The shift from one mode of illumination to the other is controlled, like other aspects of the metrological machine, by computer and can be quickly, simply and easily effected by actuation systems well known in the mechanical and optical arts, thereby solving the previously described problem of inadequate TTL surface and grid illumination for systems of this type.

DESCRIPTION

Figure 1:
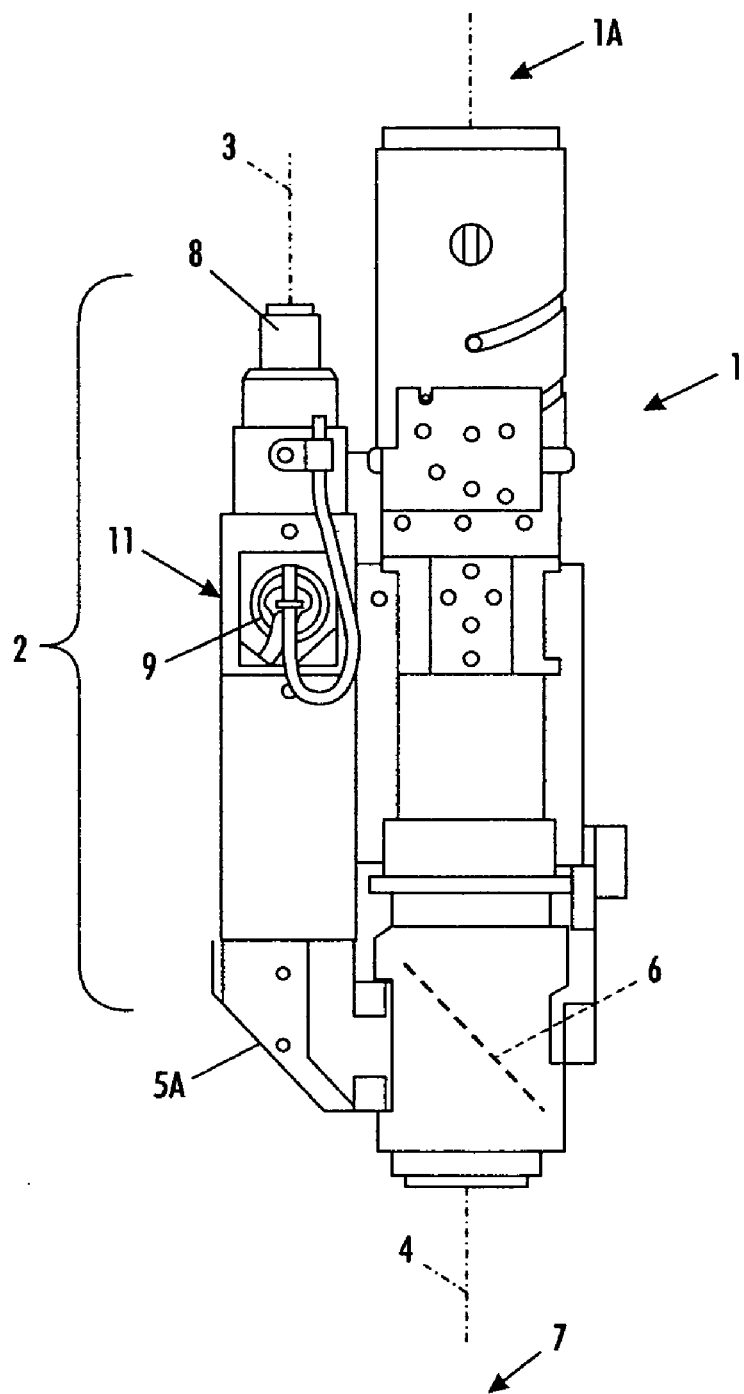
FIG. 1 provides a front elevational view illustrating some basic components of a metrological machine incorporating the teachings of my invention.

FIG. 1 provides a basic illustration of some primary components of a metrological machine (denoted generally by arrow 1) sans imaging camera (which would normally be located at 1A). As will be noted from review of this drawing figure in conjunction with FIGS. 3 and 4, the illumination system (indicated by bracket 2 in FIG. 1) is oriented around an illumination system optical axis 3 parallel to the main optical axis 4 of the metrological machine 1. (This is not required, but is the most convenient and functional manner in which to orient the illumination system 2).

The illumination system 2 projects illumination along its optical axis 3 that is reflected 90 degrees by a mirror 5 located at corner 5A so as to transversely intersect the main optical axis 4 in the region of a beam splitter (denoted by broken line 6) oriented to reflect a portion of the illumination downward along the main optical axis 4 onto a work object located in an inspection zone 7 below the metrological machine 1. (Cf., U.S. Pat. No. 6,292,306, and discussion above).

Figure 3:
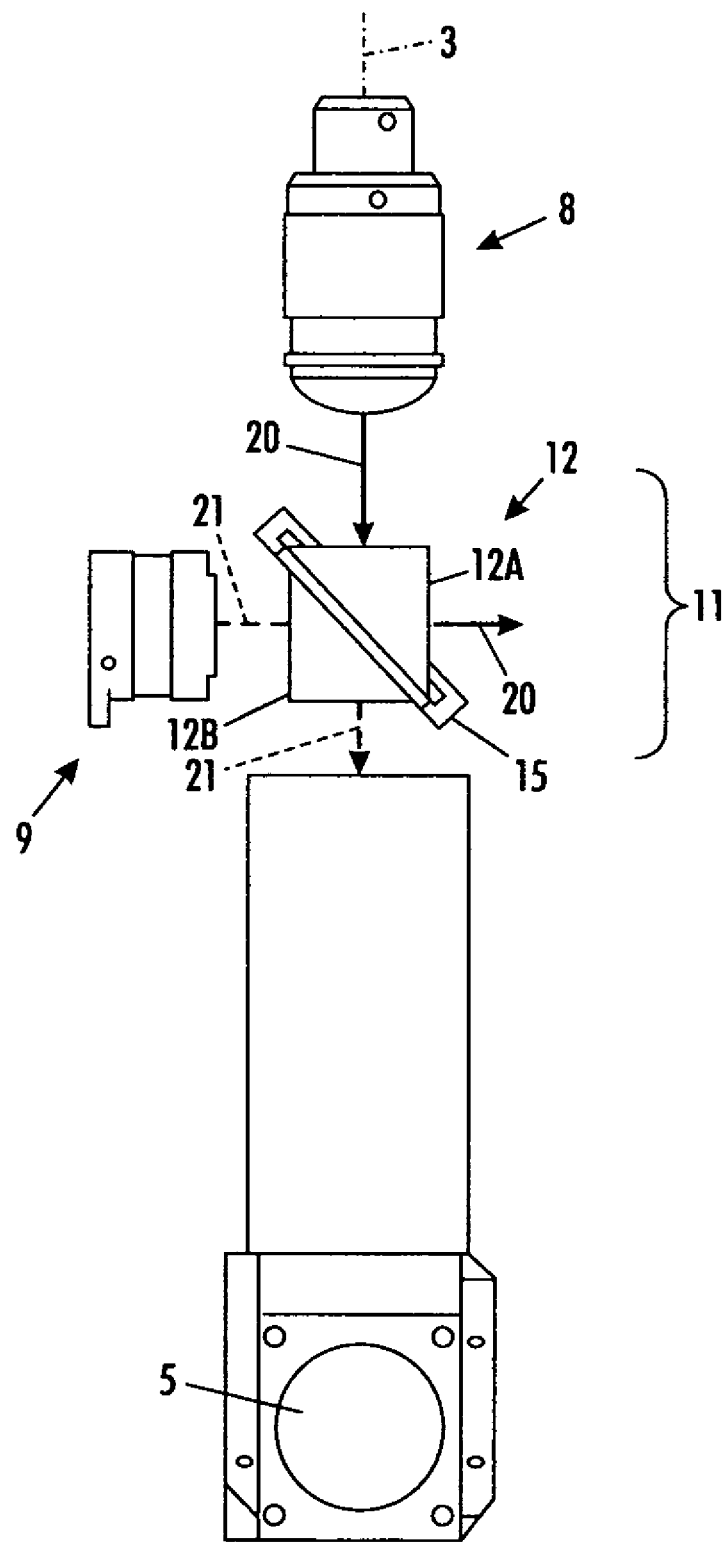
FIG. 3 provides a schematic illustration of a metrological machine illumination system in accordance with the teachings of my invention, where the cube is oriented for total internal reflection of grid illumination.
Figure 4:
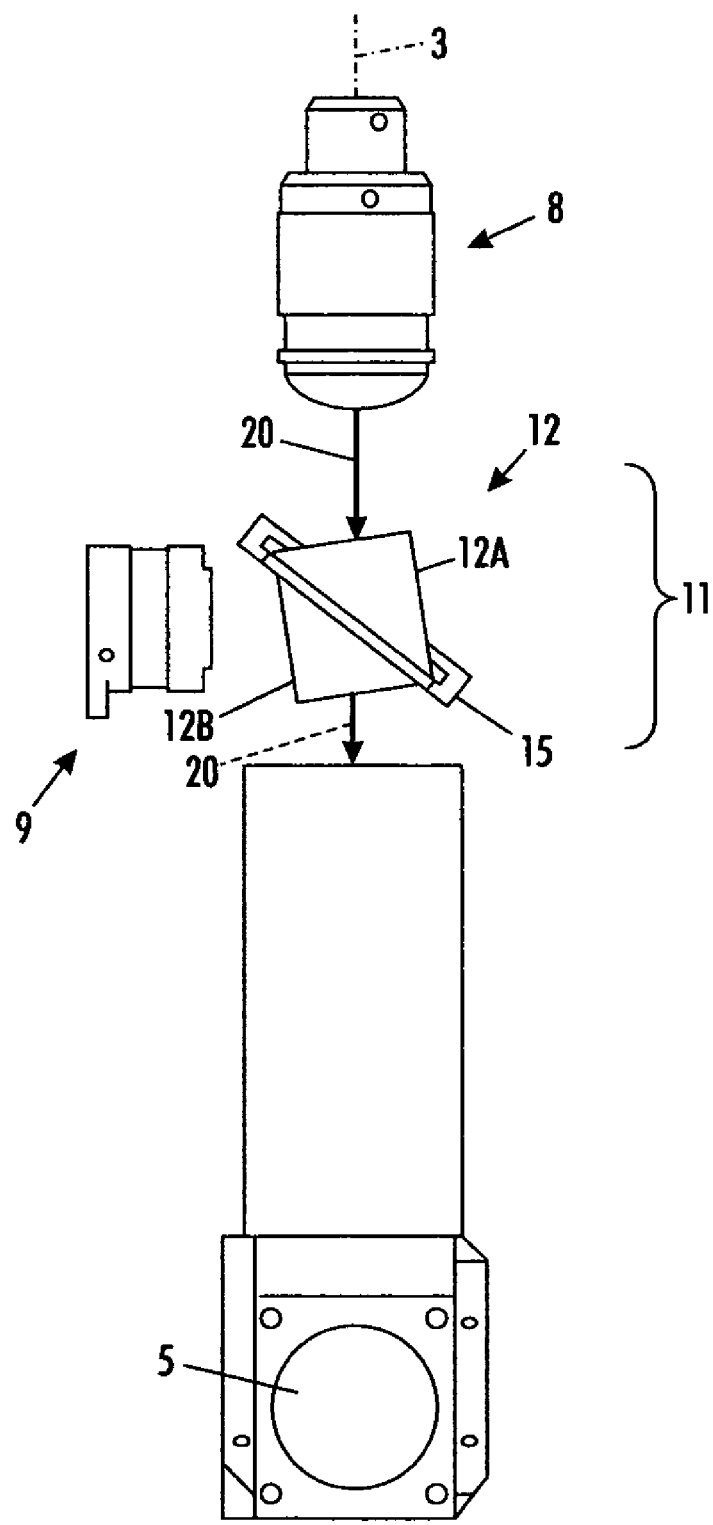
FIG. 4 provides a schematic illustration of a metrological machine illumination system in accordance with the teachings of my invention, where the cube is not oriented for total internal reflection, but for maximum transmission of surface illumination.

As better seen in FIGS. 3 and 4, the illumination system 2 includes a surface illumination source (first source 8) and a grid illumination source (second source 9) for a grid. And, in this typical embodiment, the first (surface) illumination source 8 projects light along said optical illumination system axis 3, while the second (grid) illumination source 9 projects light transverse to illumination system axis 3 so as to intersect said axis 3 at an intersection locus 11. However, the roles of the first and second illumination sources 8, 9 could be reversed with the first source 8 being a grid illumination source and the second source 9 being the surface illumination source. Likewise, the illumination sources 8, 9 could be used for projecting different grids, different types or colors of surface illumination, or for a variety of other purposes. Thus, any description of either of the sources 8, 9 as grid or surface illumination should not be seen as restrictive in terms of the nature of the illumination provided by first source 8 and second source 9.

Normally, a beam splitter, as discussed above, would be located at locus 11 and, in the case of a 50/50 beam splitter, would allow half of the light from first illumination source 8 and second illumination source 9 to continue along illumination system axis 3. Then, as previously discussed, the illumination from either or both of these two sources 8, 9 would continue along the optical illumination pathway, being reflected from the mirror at corner 5 and reflected downward along main optical axis 4 via beam splitter 6 onto inspection zone 7.

Figure 2A:
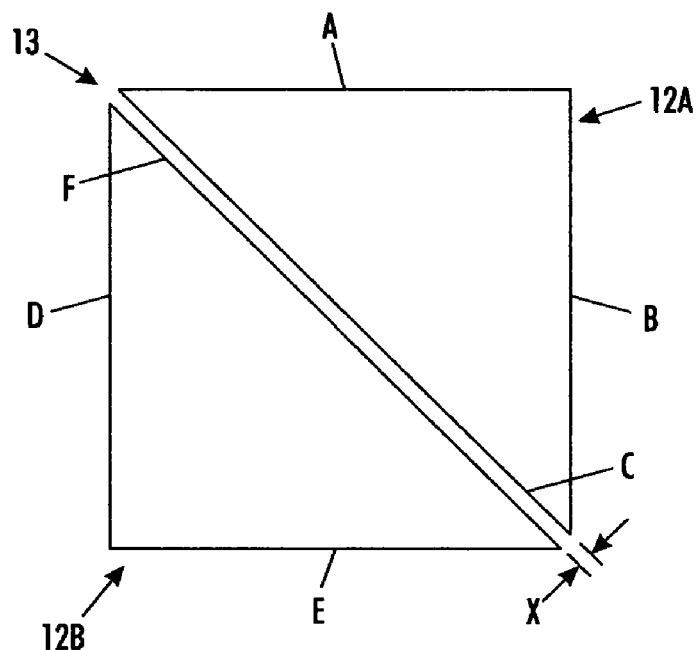
FIG. 2A provides a schematic illustration of a cube assembly for use in accordance with the teachings of my invention.
Figure 2B:
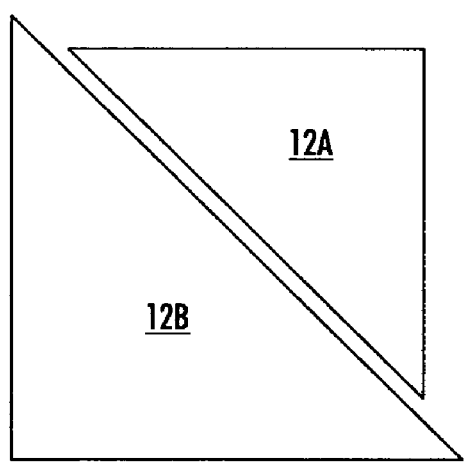
FIG. 2B provides a schematic illustration of a cube assembly where one half of the cube assembly is smaller than the other.

This pattern is altered in my invention by the introduction of rotatable cube assembly 12 in place of the normative beam splitter at locus 11. The cube assembly 12 of my invention, as schematically illustrated in FIG. 2A, comprises two halves of a cube (upper prism 12A and lower prism 12B), formed in this embodiment from typical optical material BK7. The halves 12A, 12B are separated by a distance X, creating a gap 13 (whether evacuated or an air space) between the two halves 12A, 12B. And, as light is passing from the dense material of either of the prisms 12A (at interface surface C) and 12B (at interface surface F) into the less dense medium of gap 13, total internal reflection becomes a possibility.

Total internal reflection ("TIR") is an optical phenomenon that occurs at a medium boundary such as surfaces C, F where light is refracted enough at the boundary to prevent its transmission through the boundary, effectively sending it backwards—i.e., reflecting all of the light. When light crosses the boundary between materials with different refractive indexes, the light beam can be partially refracted at the boundary and partially reflected. Total internal reflection ("TIR") can only occur where light travels from a medium with a higher refractive index (typically a denser material) to one with a lower refractive index (typically a less dense material). Thus, e.g., it can occur when passing from the material composing prism 12B to the air in gap 13, but not when passing from air to glass as it initially enters prism 12B.

The "critical angle" is the angle of incidence above which such total internal reflection occurs, as measured with respect to a "normal" at the refractive boundary (surface C or F). Thus, if the angle of incidence is greater (i.e., closer to the boundary and farther from the normal) than the critical angle, the incident light will stop crossing surface C or F altogether and instead totally reflect back internally. For visible light traveling from glass into air (or vacuum), the critical angle is approximately 41.5 degrees.

Thus, instead of using a 50/50 beam splitter of the types outlined above to inject TTL grid illumination, my system uses the two right angle triangular prisms 12A, 12B with an air space in between. Prisms 12A and 12B are similar to those used in a cube beam splitter, and are also aligned to each other along their respective hypotenuses—surfaces C and F (like those in a cube beam splitter). But, in my invention, the two triangular prisms 12A and 12B are not glued together at surfaces C, F, there are no reflective materials used at their interface, and the two halves are separated by some distance—X.

Distance X must be larger than a couple of waves to ensure complete total internal reflection (TIR). If the gap 13 is too small, light will "leak" through and the maximum amount of light will not be reflected using the TIR method. If the gap 13 is small enough that a piece of dirt or dust will come in contact with both sides there would, once again, be problems in achieving total internal reflection. However, if the gap 13 is too large, light will be lost due to "vignetting". (The light rays going into the cube are diverging, and to accept the rays the cube size would have to increase-this cannot be done due to the limited space available for cube assembly 12). Thus, an ideal gap 13 of approximately 127 microns is preferred for the value of "X" the distance between triangular prisms 12A, 12B. This will allow TIR and not vignette the light.

Therefore, as illustrated in FIG. 3, when the upper/lower faces of cube assembly 12 are approximately normal to the optical axis of the illumination system 3, a normal taken from interface surface C of upper prism 12A will be at approximately 45 degrees to the light 20 emitted by first source 8, and interface surface F of lower prism 12B will be at approximately 45 degrees to the light 21 emitted by second source 9. (Preferably, the cube assembly 12 is canted from the "normal" position towards the second source 9 by approximately 1 degree to maintain TIR even with diverging imaging rays from second source 9). In this position the cube assembly 12 reflects virtually all of the light 21 from the second source of TTL illumination 9 due to total internal reflection ("TIR"), projecting it down the illumination system optical axis 3 so that it can reflect off of mirror 5, beam splitter 6, and pass through the lens ("TTL") onto the work object in inspection zone 7. (See, FIG. 3). Likewise, light 20 from first source 8 is also reflected and no longer travels down optical axis 3 to reflect off of mirror 5.

However, canting the cube assembly 12 an additional 11 degrees to 12 degrees, as illustrated in FIG. 4, reduces the angle of incidence of light 20 from first source 8 on surface C below the critical angle, eliminating total internal reflection for light 20 and allowing almost all of the light 20 from the first source of TTL illumination 8 to pass through the cube illumination system for use in illuminating the work object in inspection zone 7. (See, FIG. 4). Meanwhile, light 21 from the second source 9 is transmitted through cube 12 and no longer exits prism 12B parallel to light system optical axis 3, to be reflected off of mirror 5 and illuminate inspection zone 7. (See. e.g., light ray 21A of FIG. 5). (Hence, a light source 9, 10A is usually turned off in this situation).

Thus, by utilizing the principle of total internal reflection I allow nearly 100% of the reflected light 21 for imaging the grid from second illumination source 9 to reach beam splitter 6 and be used for illumination of a work object in inspection zone 7 and, by rotating the "cube" (cube assembly 12) slightly past the critical angle, I allow nearly 90% of the light 20 from the TTL surface illumination (first illumination source 8) to reach beam splitter 6 and be used for this purpose. With both sources of illumination activated, the shift from one mode of illumination to the other is controlled, like other aspects of the metrological machine, by computer and can be quickly, simply and easily effected by actuation systems well known in the mechanical and optical arts without deactivating either source 8, 9, thereby solving the previously described problem of inadequate TTL surface and grid illumination for systems of this type. (Sources 8, 9 can, however, also be deactivated and re-activated in conjunction with the use of the invention if desired).

Figure 5:
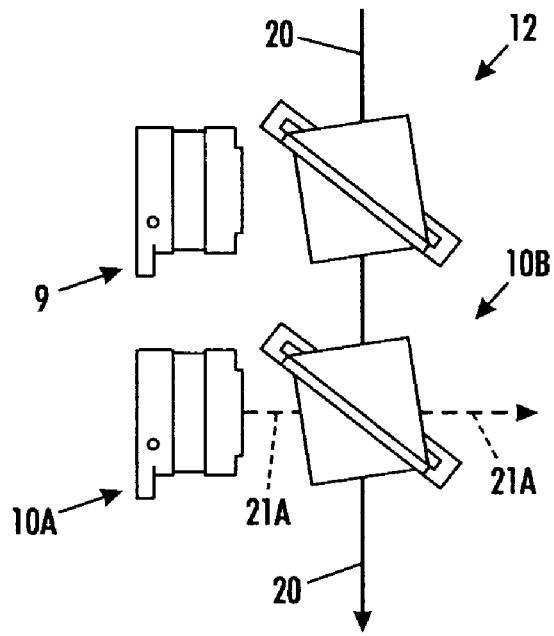
FIG. 5 provides a schematic illustration of a portion of a metrological machine illumination system in accordance with the teachings of my invention which has two cubes, with both cubes being oriented for maximum transmission of surface illumination.
Figure 6:
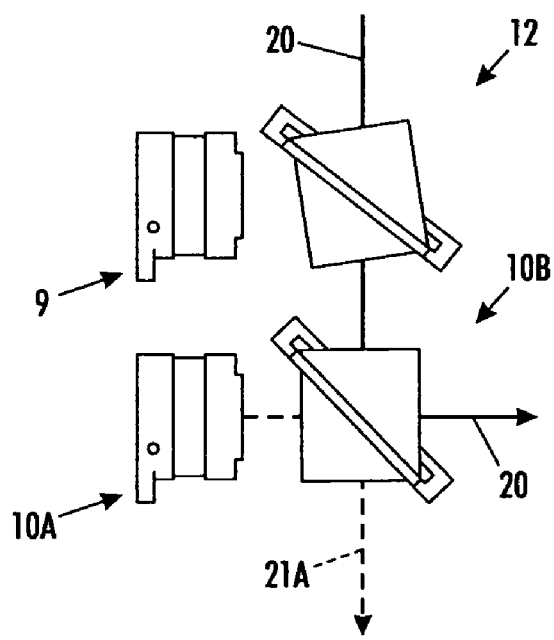
FIG. 6 provides a schematic illustration of a portion of a metrological machine illumination system in accordance with the teachings of my invention which has two cubes, with one cube being oriented for total internal reflection of grid illumination.

Further, my invention allows "stacking" of the cube assemblies so that more than two illumination alternatives are possible. Thus, in FIG. 5 a plurality of "second sources" is shown, including original "second" source 9 and an additional "second" source of illumination 10A having its own cube 10B. Where, as illustrated in FIG. 5, all of the cubes provided are oriented for transmission along optical axis 3, transmission of light 20 from first source 8 continues. However, second source 9 cube 12 or additional second source 10A cube 10B can be rotated so as to effectuate a condition of total internal reflection as illustrated in FIG. 6 with respect to second source 10A. These configurations will bring light 21 from second source 9 or light 21A from additional second source 10A (as illustrated in FIG. 6) to bear on the inspection zone 7. Thus, as will be clear from these drawing figures, a plurality of sources transverse to axis 3 can be used to provide any variety and type of illumination required, with the only proviso being that all cubes between the cube rotated to a TIR position and mirror 5 are positioned for transmission of light received along axis 3. Likewise, as the foregoing makes clear, the positioning of a first source 8 positioned to provide light 20 along axis 3 is purely optional when multiple transverse "second" sources are used.

From a practical construction standpoint, the cube assembly halves 12A and 12B may be separated by a shim/seal 15 along the edges of surfaces C and F. The space or gap 13 between the halves 12A, 12B must be sealed to prevent dust, dirt and debris from contacting surfaces C and F and collecting within the separated distance X. Furthermore, the entire cube assembly 12 should be enclosed to prevent dirt, dust and debris from collecting on any other surface. Since this is in the imaging path, it will be focusable in the system at some Z height relatively close to the grid image—see description of system. In addition, surfaces A, B, D, E should advantageously have anti-reflection coatings of types known in the art to obtain the maximum amount of light transmission through those surfaces. (Surfaces C and F, however, have NO COATING). Further, as illustrated in FIG. 2A, if space is a constraint in the system, the cube halves 12A, 12B do not have to be the same size. The reflected or TIR portion of the system (prism 12B) can generally be larger than the transmission side (prism 12A)—as the system being transmitted through the cube is generally considerably smaller than that being reflected.

However, though the invention is generally described in terms of a specific embodiments and modes of operation involving grid and surface illumination sources in a certain orientation, numerous changes could be made without exceeding the scope of the inventive concept disclosed herein. Further, various of the above-disclosed and other features and functions, or alternatives thereof, may be desirably combined into many other different systems or applications. Thus, various presently unforeseen or unanticipated alternatives, modifications, variations or improvements therein may be subsequently made by those skilled in the art which are also intended to be encompassed by the following claims.

What is claimed is:

1. An optical system, comprising:
   at least one rotatable beam splitter, the at least one rotatable beam splitter including two right angle prisms in spaced relationship, the prisms having respective adjacent hypotenuses with an air gap therebetween; and
   wherein said at least one rotatable beam splitter is: rotatable to a position where it uses total internal reflection to reflect light received, and rotatable to a position where said light entering the rotatable beam splitter and traversing one of its prisms is incident on the hypotenuse of said prism at less than the critical angle such that said light is transmitted through said prism.

2. The optical system described in claim 1, wherein at least one of: neither of said hypotenuses is coated with a reflective material, and at least one face of said at least one rotatable beam splitter receiving light has an anti-reflection coating.

3. The optical system described in claim 1, wherein said hypotenuses are separated by one of: two wavelengths of a wavelength of light used in the optical system and approximately 127 microns.

4. The optical system as described in claim 1, wherein the gap between said prisms is sealed to prevent materials from entering between said prism hypotenuses.

5. The optical system described in claim 1, wherein said optical system further comprises:
a first light source projecting light along an optical pathway and a second light source projecting light so as to intersect said optical illumination pathway at an intersection locus, and said at least one beam splitter is located at said intersection locus so as to be capable of receiving light from said first light source and said second light source.

6. The optical system of claim 5, wherein said at least one beam splitter can be rotated between at least two orientations, a first orientation where said beam splitter reflects light received transverse to said optical pathway so that said transversely received light continues out of said beam splitter along said optical pathway, and a second orientation where said beam splitter transmits light received along said light pathway so that said optical pathway received illumination continues along said optical pathway.

7. The optical system described in claim 6,
wherein at least one of: said at least one rotatable beam splitter uses total internal reflection when in said first orientation to reflect the light received, and said at least one rotatable beam splitter is rotatable to a position where light entering the rotatable beam splitter and traversing one of its prisms is incident on the hypotenuse of said prism at less than the critical angle such that said light is transmitted through said prism; and
wherein at least one of: neither of said hypotenuses is coated with a reflective material, at least one face of said at least one rotatable beam splitter receiving light has an anti-reflection coating, said hypotenuses are separated by two wavelengths of a wavelength of light used in the optical system, and said hypotenuses are separated by approximately 127 microns.

8. The optical system described in claim 6, wherein at least one of: neither of said hypotenuses is coated with a reflective material, and at least one face of said at least one rotatable beam splitter receiving light has an anti-reflection coating.

9. The optical system described in claim 6, wherein said hypotenuses are separated by one of: two wavelengths of a wavelength of light used in the optical system and approximately 127 microns.

10. The optical system as described in claim 6, wherein the gap between said prisms is sealed to prevent materials from entering between said prism hypotenuses.

11. The optical system described in claim 1, wherein said at least one rotatable beam splitters is a plurality of rotatable beam splitters, each of said plurality of rotatable beam splitters being at least one of: rotatable to a position where it uses total internal reflection to reflect light received, and rotatable to a position where light entering the rotatable beam splitter and traversing one of its prisms is incident on the hypotenuse of said prism at less than the critical angle such that said light is transmitted through said prism.

12. The optical system described in claim 11, wherein as to each of said rotatable beam splitters at least one of: neither of its said hypotenuses is coated with a reflective material, and at least one face of said rotatable beam splitter receiving light has an anti-reflection coating.

13. The optical system described in claim 11, wherein said hypotenuses are separated by one of: two wavelengths of a wavelength of light used in the optical system and approximately 127 microns.

14. The optical system as described in claim 11, wherein the gaps between said prisms are sealed to prevent materials from entering between said prism hypotenuses.

15. The optical system described in claim 11, wherein said optical system further comprises a first light source projecting light along an optical pathway and a plurality of second light sources each projecting light so as to intersect said optical pathway at a respective intersection locus, and each of said plurality of beam splitters is located at one of said intersection locii so as to be capable of receiving light from said first light source and a said second light source.

16. The optical system of claim 15, wherein each of said plurality of beam splitter can be rotated between at least two orientations, a first orientation where said beam splitter reflects light received transverse to said optical pathway so that said transversely received light continues out of said beam splitter along said optical pathway, and a second orientation where said beam splitter transmits light received along said optical pathway so that said optical pathway received light continues along said optical pathway.

17. The optical system described in claim 16,
wherein at least one of said plurality of rotatable beam splitters use total internal reflection when in said first orientation to reflect the light received, and said plurality of rotatable cube beam splitters are rotatable to a position where light entering the rotatable beam splitter and traversing one of its prisms is incident on the hypotenuse of said prism at less than the critical angle such that said light is transmitted through said prism; and
wherein at least one of: none of said hypotenuses is coated with a reflective material, at least one face of each said rotatable beam splitters receiving light has an anti-reflection coating, said hypotenuses are separated by two wavelengths of a wavelength of light used in the optical system, and said hypotenuses are separated by approximately 127 microns.

18. The optical system described in claim 16, wherein at least one of: none of said hypotenuses is coated with a reflective material, and at least one face of each said rotatable beam splitters receiving light has an anti-reflection coating.

19. The optical system described in claim 16, wherein said hypotenuses are separated by one of: two wavelengths of a wavelength of light used in the optical system and approximately 127 microns.

* * * * *